(12) United States Patent
Riddle et al.

(10) Patent No.: US 6,173,482 B1
(45) Date of Patent: Jan. 16, 2001

(54) HULL CONFIGURATION OF A MODIFIED TRACKED VEHICLE

(75) Inventors: Matthew Guy Riddle; William C. Grusonik, both of San Jose; Claude Philip Braafladt, Santa Clara; Harlan Burnham, San Jose; Robert Owens Crosswhite, Fremont; Scott Alan Greenlee, San Jose; Nicholas Francis Hayes, San Francisco; Steven Eric Nelson; Richard Jerome Rush, both of San Jose, all of CA (US)

(73) Assignee: United Defense, L.P., Arlington, VA (US)

( * ) Notice: Under 35 U.S.C. 154(b), the term of this patent shall be extended for 0 days.

(21) Appl. No.: 08/918,274

(22) Filed: Aug. 25, 1997

(51) Int. Cl.⁷ .................................................... B21K 21/16
(52) U.S. Cl. ........................ 29/401.1; 29/426.2; 29/426.1
(58) Field of Search ............................... 29/897.2, 401.1, 29/426.1, 428, 521, 402.01, 426.2; 296/188

(56) References Cited

U.S. PATENT DOCUMENTS

| | | | |
|---|---|---|---|
| 3,309,759 | * 3/1967 | Vittone | 29/897.2 |
| 3,730,582 | * 5/1973 | Lieffring | 29/401.1 |
| 3,754,315 | * 8/1973 | Heitman | 29/897.2 |
| 3,862,490 | * 1/1975 | Tsuneishi et al. | 29/521 |
| 3,909,919 | * 10/1975 | Miyabayshi et al. | 29/521 |
| 4,346,930 | * 8/1982 | Northey | 29/401.1 |
| 4,457,555 | * 7/1984 | Draper | 29/401.1 |
| 4,514,891 | * 5/1985 | Draper | 29/401.1 |
| 4,569,554 | * 2/1986 | Dodgen | 29/401.1 |
| 4,570,321 | * 2/1986 | Draper | 29/401.1 |
| 4,654,946 | * 4/1987 | Phillips | 29/401.1 |
| 4,662,052 | * 5/1987 | Draper | 29/401.1 |
| 4,847,972 | * 7/1989 | Anderson et al. | 29/401.1 |
| 5,490,314 | * 2/1996 | Riddle | 29/401.1 |
| 5,577,311 | * 11/1996 | Riddle | 29/401.1 |

* cited by examiner

Primary Examiner—S. Thomas Hughes
Assistant Examiner—Trinh T. Nguyen
(74) Attorney, Agent, or Firm—Ronald C. Kamp (57) ABSTRACT

This invention pertains to a method of reconfiguring a family of the armored, tracked vehicle of the troop carrying type to enhance producibility and protection from mine blast fragments. By using the configuration and modification disclosed herein, mine blast protection, vertical obstacle crossing capability and cross country mobility are enhanced.

2 Claims, 7 Drawing Sheets

HULL CONFIGURATION OF A MODIFIED TRACKED VEHICLE

BACKGROUND OF THE INVENTION

1. Field of the Invention

The present invention sets forth a vehicle structure and provides a method for improving a military vehicle of the armored, tracked, troop carrying type to create a more cost-efficient, producible design with improved vertical obstacle crossing capability, and higher off-road cross country mobility.

2. Description of the Prior Art

Armored tracked vehicles of the troop carrying type, such as an "M113" armored personnel carrier, have been in production for over 35 years. This type of vehicle has been used for various services, including as a command post, missile launcher, hazardous material incidents respond vehicle, cargo carrier, ambulance, reconnaissance and recovery vehicle. The same chassis structure has been used for each of these vehicle types. The traditional design of this family of vehicles included two box beam extrusions, forming lateral perimeter frame members of the hull. These box beam extrusions extend from the front of the vehicle to the back of the vehicle. Integrated to the outboard surfaces of each of the box beam extrusions are lower side plates, personnel protection plates and the five roadwheel trunnion mounting pads or "bogey" pads used to accommodate the suspension of the vehicle.

In the current production model of this vehicle, the joining of the lower side plates and the personnel protection plates to form the lower hull is labor intensive and time consuming. First, the personnel protection plate, sometimes referred to as a doubler, had to be welded to the lower side plate. The resultant subassembly then had to be subjected to a straightening procedure to restraighten the lower side plate weld processing distortion. Afterwards, the subassembly, consisting of the lower side plate and the doubler, had to be welded to the box beams. Again, the lower side plate assembly had to be straightened due to the weld process distortion from welding the lower side plates to the box beams. At this point of fabrication of the lower hull, the last remaining significant element to be completed was the welding of the bogey pads to the exterior vehicle surface of the box beams. In some instances, even at this stage, the final lower side plate would need straightening due to the weld process distortion from welding the bogey pads to the lower side plate assembly.

U.S. Pat. No. 5,490,314, *Stretch Vehicle Conversion Method,* included modification procedure that resulted in an upper hull that was mostly discarded and recycled because of where the original upper hull had to be cut to accommodate the replacement stretched lower hull. In the instant invention, the upper hull is largely reused in the improved modified hull presented here. As a result, the intact equipment mounting provisions, that is, the myriad attachment points, fixtures and surface indentations do not have to be refabricated on a totally new hull as they are intact on the original hull. This results in tremendous time savings in the conversion process.

SUMMARY OF THE INVENTION

It is an object of the invention to provide an armored personnel carrier or infantry fighting vehicle modified from a prior existing donor vehicle at a reduced manufacturing cost without degradation of ballistic protection or hull structure rigidity.

Another object of the invention is to enhance resistance of the exposed surfaces of an infantry fighting vehicle to penetration of piercing fragments from land mine explosions by provision of a thicker lower side plate of the hull structure and the accommodation of an armor plate fastened to the bottom of the sponson portion of the lower hull structure.

The present invention is primarily concerned with a new hull structure for use "under" an existing superstructure for the family of tracked vehicles normally used for troop transportation. Particularly, the hull configuration and modification method disclosed herein includes replacing the current multi-element assembly in the lower hull with a single, thick metal plate. The new structure will have the structural rigidity of the prior art hull without the need for box beam frame members. This is accomplished by machining of the new metal plate rather than the creation of an assembly by welding the various elements together to form the lower hull side plate. As a result of the replacement of the box beam structure with the monocoque structure of the lower hull, the suspension components can be bolted closer to the bottom of the hull because the bogey pads can now protrude below the bottom plate surface without consideration for the necessary weld seam area around such an external pad. This results in measurably increased vehicle ground clearance, everything else being equal. Also, the new hull structure provides for additional space under the bottom side of the sponson to accommodate an armor plate. This was not possible in the previous structure without significantly reducing the suspension travel and impeding cross country mobility and agility. It is this armor plate and the thicker lower side plate that provide the increased resistance to the penetration of piercing fragments from mine explosion advantage mentioned above.

A second advantageous element of the single thick vertical metal plate construction, the monocoque lower hull mentioned above, is the producibility gains by eliminating the need for two sub-assembly weldments, one on each side of the length of the vehicle. These weldments were time intensive critical welds, thus elimination of them is a real advantage.

The sponson is a horizontally flat piece from the front glacis, the glacis being a sloped plate at the front of the vehicle, to the back portion of the vehicle. The sponson is humped upwards at the front and rear of the vehicle due to the suspension modifications designed to improve cross country mobility. In the front, the sponson is humped upwards where the main drive sprocket has been rotated to a new angular position around the main drive input shaft. In the rear, it is humped upwards where the idler assembly has been raised. This rotation of the main drive sprocket and raising of the idler assembly have increased the clearance from the sprocket and the idler to the ground relative to the prior art vehicles, resulting in improved vertical obstacle crossing capability, and higher off-road cross country mobility.

DESCRIPTION OF THE PREFERRED EMBODIMENT

The invention will be understood by reading the following description of the preferred embodiment of the invention while perusing the drawing figures.

Figure 1:
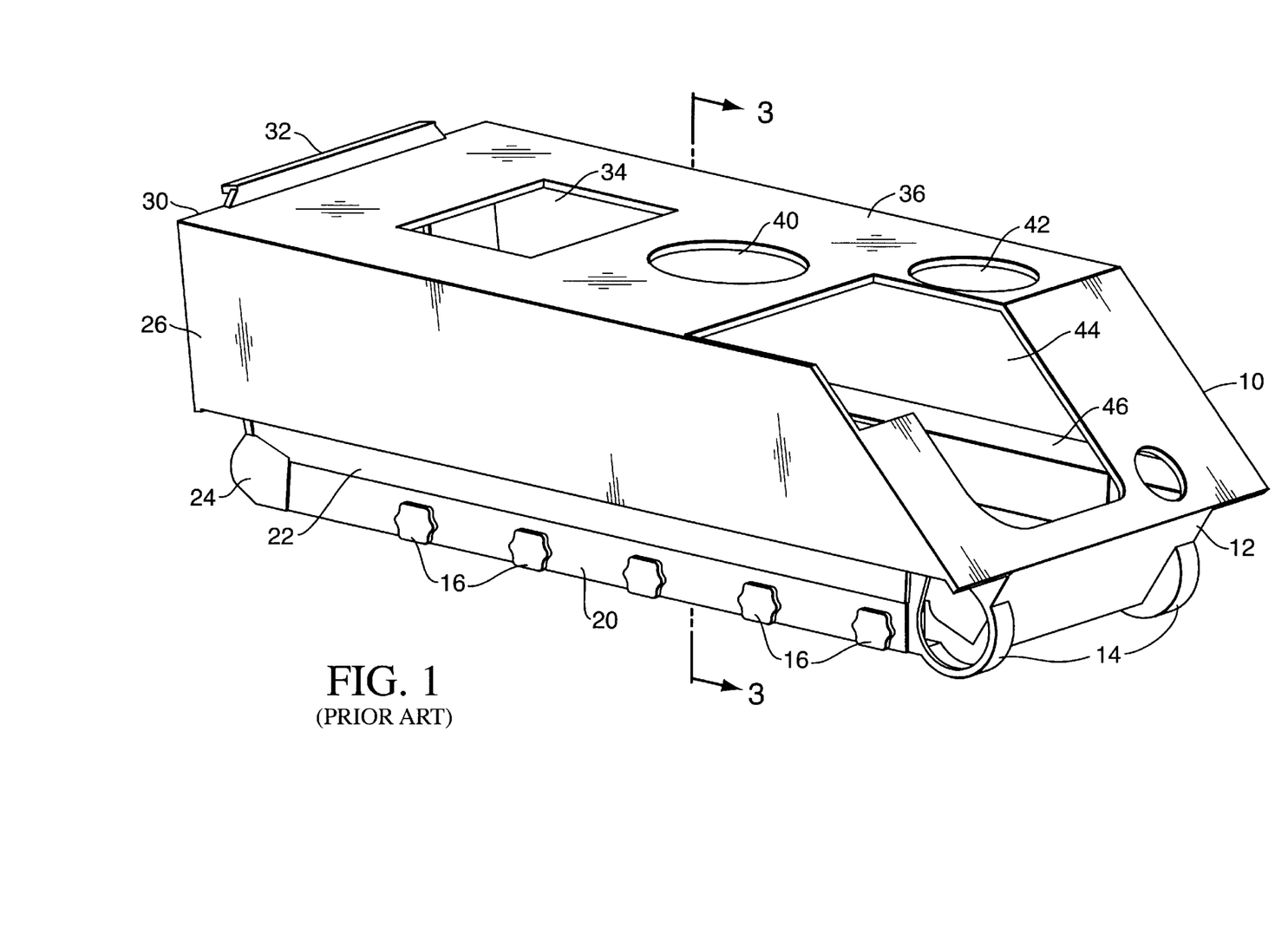
FIG. 1 is a perspective view of a hull of a current production tracked military vehicle.

FIG. 1 shows a perspective drawing of a current production armored tracked vehicle of the troop carrying type. Starting with the upper front slope plate or glacis 10 and going in a clockwise fashion, the next major feature in this figure is the lower front glacis 12, which extends downward from the upper front glacis 10. Below that is a pair of final drive housings 14 which are attached to the lower vertical side plates 22. Bogey pads 16 are welded to the outer vehicle surface of the box beam 20. Towards the rear of the vehicle, just below the upper side vertical plate 26 is an idler pad 24. There is another idler pad situated directly opposite on the other side of the vehicle. There is a ramp opening 32 on the rear plate 30 to allow ingress and egress of the crew. A cargo hatch opening 34 is punched through a top plate 36 to allow the passage of cargo to the interior of the vehicle. A vehicle commander's cupola opening 40 and the vehicle driver's opening 42 allow the commander and the driver, respectively, to navigate the terrain. An engine compartment 44 is shown without the engine, thus giving a view of the sponson 46.

Figure 2:
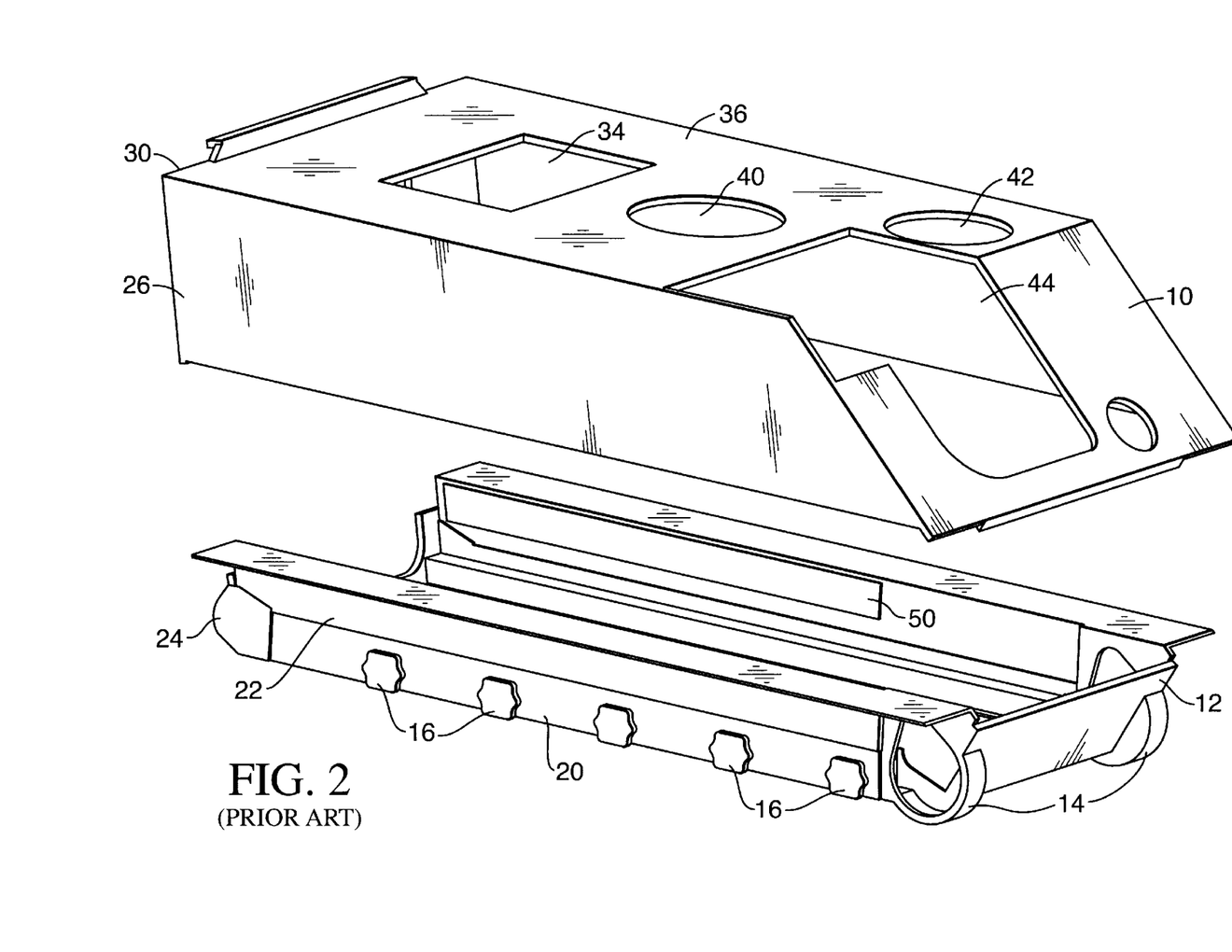
FIG. 2 is a perspective view of the separated lower hull and upper hull of a current production tracked military vehicle shown in FIG. 1.
Figure 3:
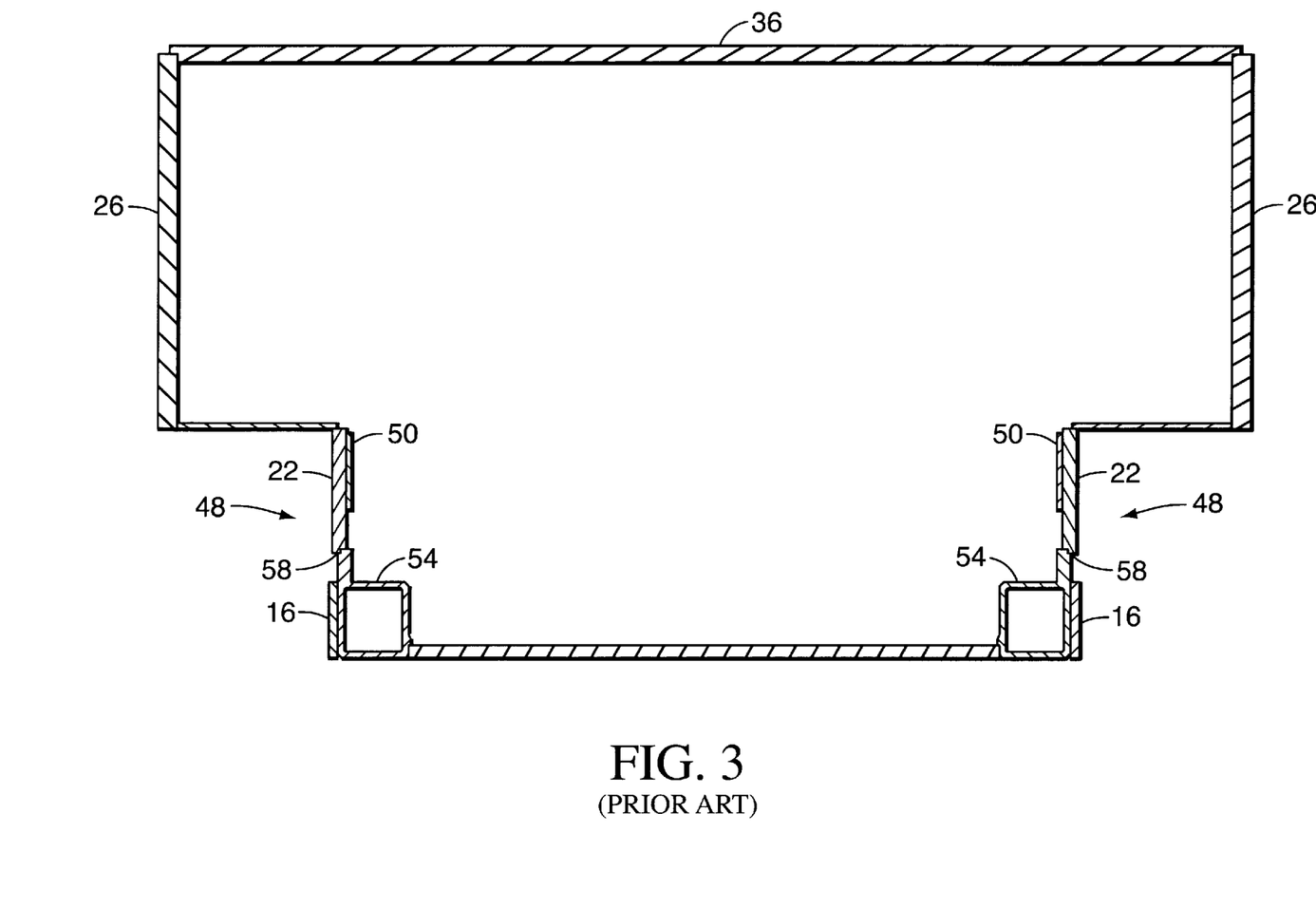
FIG. 3 is a cross sectional view of the current production hull shown in FIG. 1 taken through plane 3—3.

When the tracked vehicle is sectioned across the upper front glacis 10, down the sponson plates 46 and across the rear plate 30, the resulting separated lower and upper hulls are shown in FIG. 2. FIG. 3 shows a cross sectional view of the current production hull shown in FIG. 1 taken through plane 3—3. The main features in the plinth zone 48 of FIG. 3 from top to bottom are the doubler 50, which is welded to the in-board of the lower side plate 22 in order to afford enhanced ballistic protection to crew members. The relatively thin-walled box beam extrusions 54 cannot provide adequate ballistic protection. Consequently, additional bolt-on armor is required to defeat threats from land mines. Also, the bogey pads 16 are of importance to add dimensional depth to the thin-walled box beams. There is a critical weld joint 58 that extends the entire vertical length of the box beam.

Figure 4:
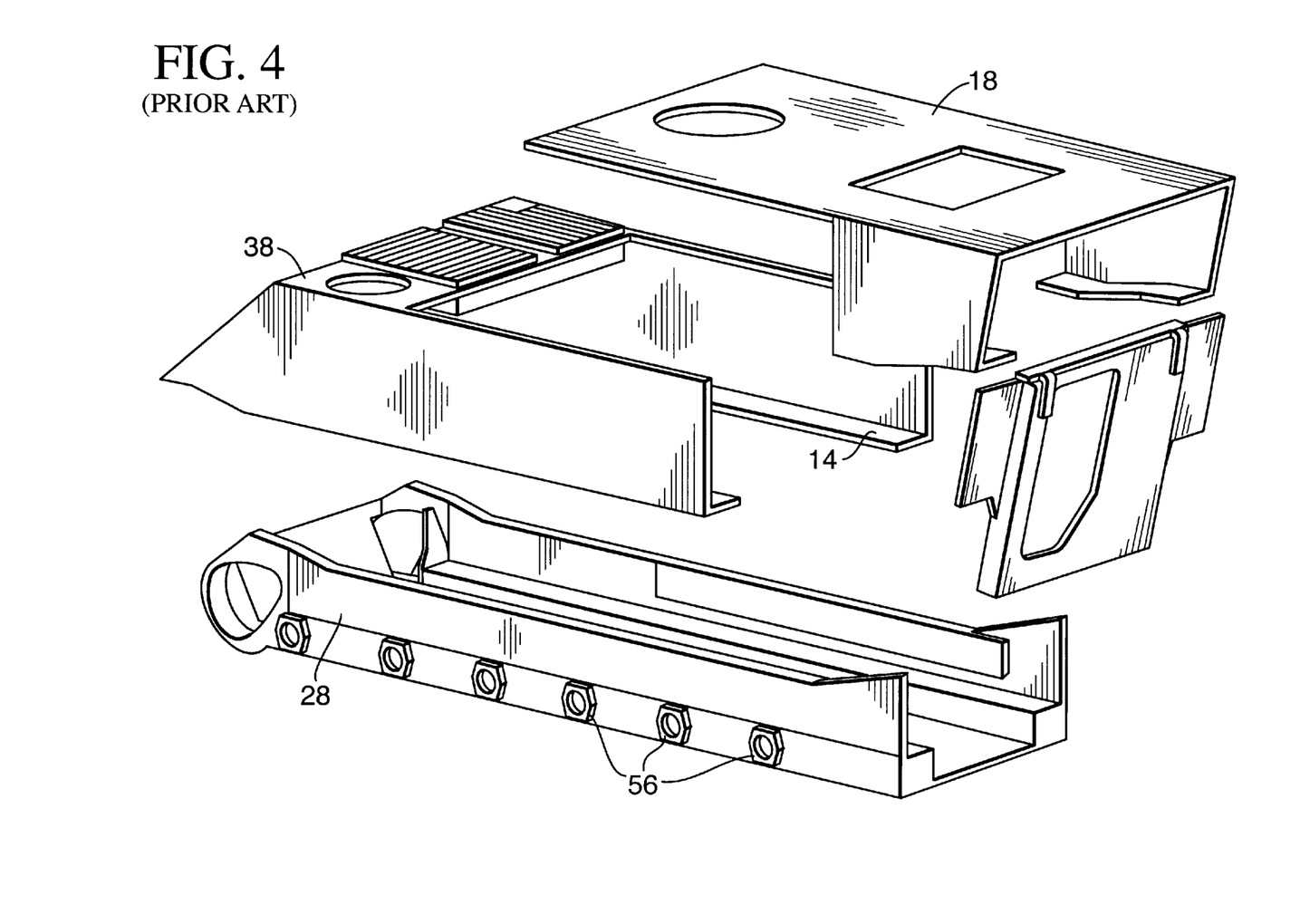
FIG. 4 is an exploded view of the prior art stretched version of the hull shown in FIG. 1.

FIG. 4 is an exploded view of the prior art stretched version of the hull shown in FIG. 1. Top plate 18 is modified in length and includes side wall extensions. A lower hull 28 is stretched. New upper hull 38 is fabricated to match with top plate 18, stretched lower hull 28 and new upper hull 38. Referring now to FIGS. 1, 2, 3 and 4, the conversion process of the prior art designs includes starting with the structure in FIG. 1 and removing all of the components to strip the vehicle to a bare aluminum hull. Lower hull and upper hull are separated. The remainder of the structure was reused with a new lower hull and a new top plate.

Figure 5:
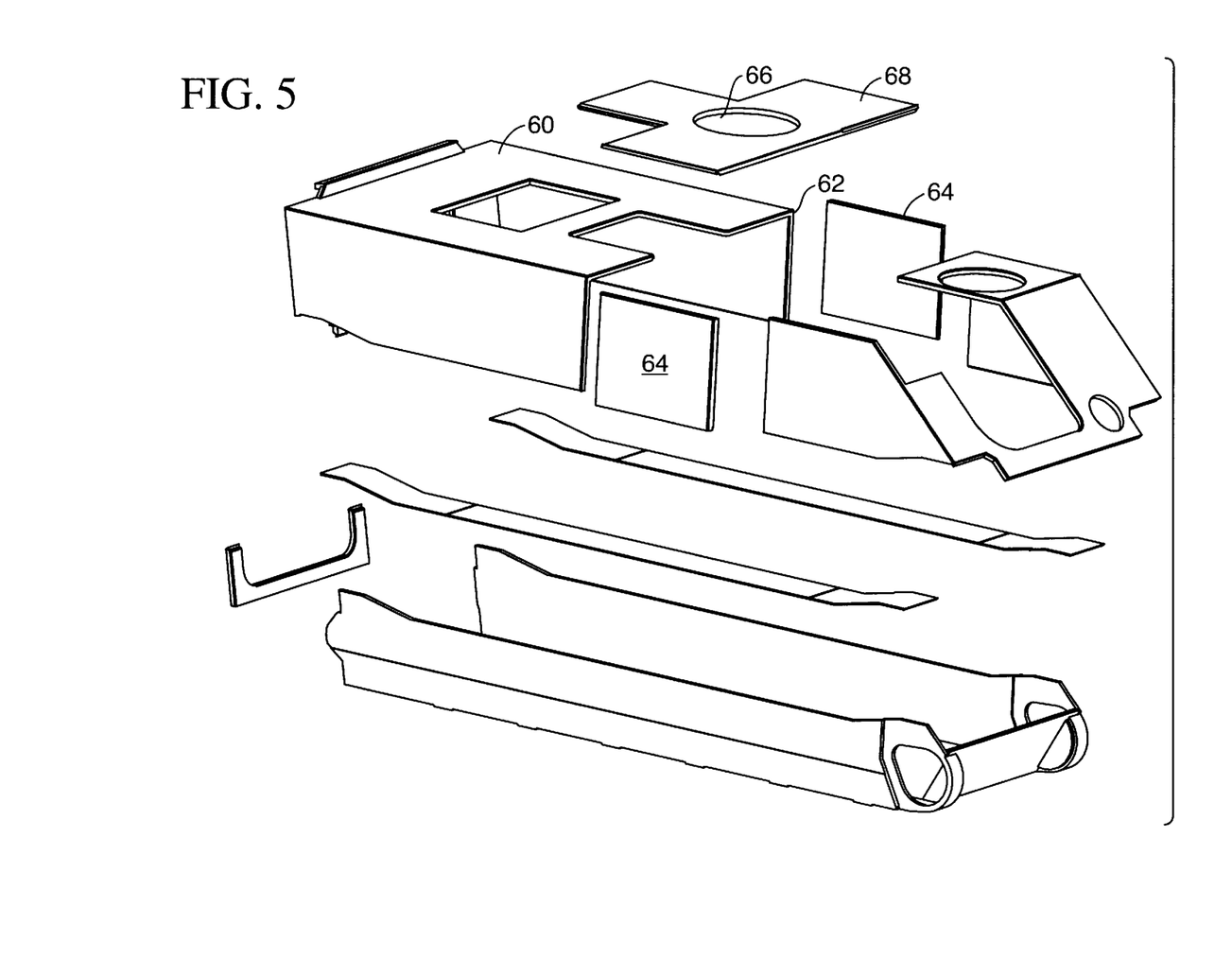
FIG. 5 is an exploded view of the instant invention hull with its lower and upper hulls separated.

The instant invention involves removing and discarding the lower hull as in the prior art. Unlike the prior art, however, the upper hull is reconfigured and modified to become part of the new vehicle rather than discarded or recycled. FIG. 5 shows an exploded view of an improved structure of an armored tracked vehicle of the troop carrying type. Top plate 60 is mostly reused by the careful positioning of where the cut 62 is made. The extant mounting provisions are preserved by the addition of side wall extension plates 64. The current location of the commander's cupola opening 66 is impinged by the bigger engine compartment necessitated by the installation of a more powerful engine. The commander's cupola opening 66 is relocated rearward in the vehicle and a T-shaped extension plate 68 is used to accommodate this relocation. The upper hull is modified minimally such that no more of the original upper hull structure is sacrificed than that which is needed to conform to mating with the new lower hull.

Figure 6:
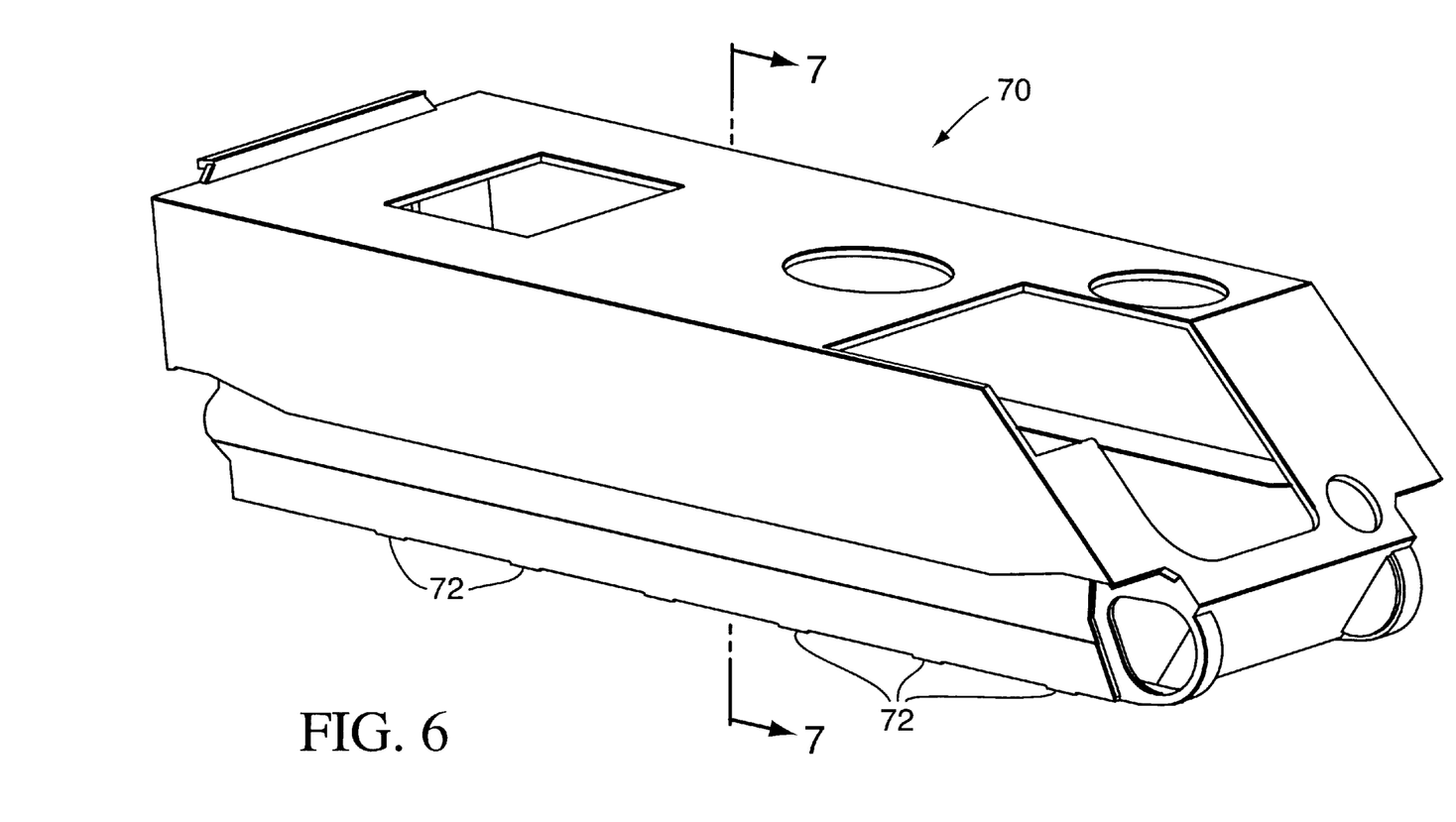
FIG. 6 is a perspective view of the assembled FIG. 5 hull.
Figure 7:
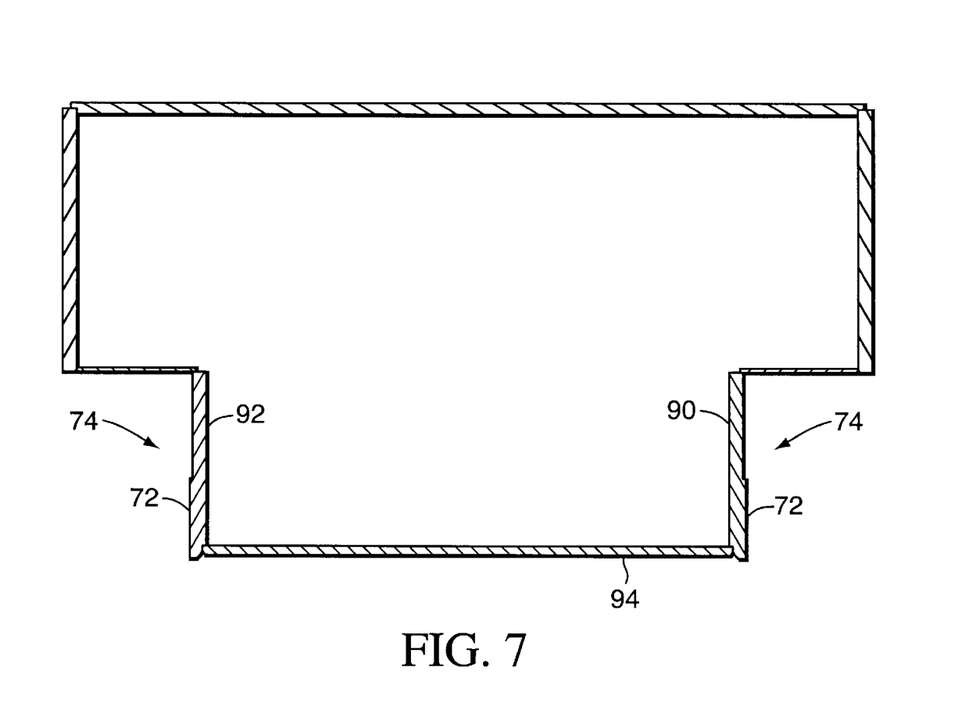
FIG. 7 is a cross sectional view of the hull shown in FIG. 6 through plane 7—7.

Furthermore, the new lower hull of the instant invention replaces the multi-element assembly of the prior art with a single, 1 inch to 3 inches, preferably 2 inches thick metal plate, having all the features of the prior art or prior production vehicles by machining of the plate rather than the creation of an assembly by welding the various elements together to form the lower hull side plate. FIG. 6 is a perspective drawing of all the improved structures assembled and welded together to compose the hull structure 70. Specifically, the welded bogey pads 56 of FIG. 4 have been replaced by machined depth extenders 72. FIG. 7 shows a cross sectional view of the hull of the instant invention where the multi-element subassemblies in the plinth zone 74 have been replaced with a pair of thick metal side plates 90, 92 with machined depth extenders 72. Each of the side plates 90, 92 has a vertical height with a notch machined or otherwise formed along their inner, lower edge. The bottom plate 94 is secured to the side plates 90, 92 so that the bottom plate 94 fits into these notches to form a mechanical lock having a shear area extending substantially the vertical height of the side plates. Not shown in this view, as they are no longer needed, are the two box beam extrusions, lower side plates, personnel protection plates and the roadwheel trunnion mounting pads or "bogey" pads. These elements have been replaced by a single thick metal plate as the lower side plate, having machined depth extenders. Consequently, the critical weld joint 58 that extends the entire length of the vehicle has been ameliorated.

Figure 8:
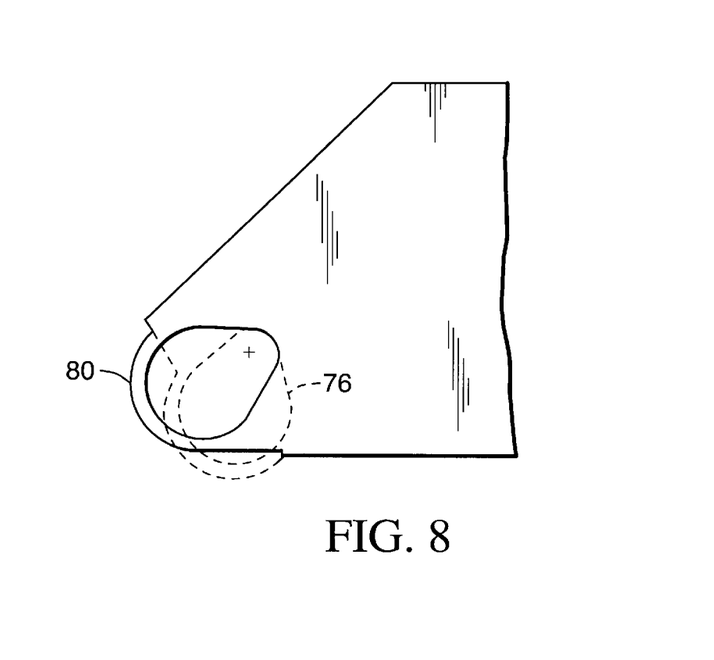
FIG. 8 is a side elevation view showing the rotation of the final drive housings about the input shaft.

FIG. 8 shows the initial position of the final drive housing in a dotted line view 76 and the new position of the final drive housing in a solid line view 80 after rotation around the input shaft. The rotation results in a changed sprocket location described by forward, upward and angular coordinates. This rotation effectuates a sprocket position that is as high off the ground as is possible with this configuration. This increase in sprocket ground clearance provides a significant increase in overall vehicle cross country mobility and vertical obstacle crossing capability. Also, since the sprocket is now the forward most portion of the vehicle, it is now considered an aggressive track layout and will allow the vehicle to climb obstacles that are taller than the sprocket itself.

The discussion above relates to the most significant structural elements of the improved vehicle invention. The modification specifics of the present invention, presenting a preferred technique of the modification, follows.

The improved, lower hull structure replaces the current multi-element subassemblies in the lower hull that included the two box beam extrusions, lower side plates, personnel protection plates and the roadwheel trunnion mounting pads or "bogey" pads with a single thick metal plate on each side of the vehicle where the desired features from the previous subassemblies have been machined into the plate. This aluminum alloy plate has to be of such thickness as to meet ballistic protection requirements of the vehicle without sacrificing hull structural rigidity and afford improved resistance to the penetration of piercing fragments from land mine explosions. Because desirable advantages, that is, the bogey pads' ability to distribute the bogey axle loads over a large area and provide sufficient hull thickness to absorb the stresses generated by the bogie axles from the bogey pads, are now machined into the aluminum plate, the bogey pads are no longer needed. Consequently, as no allowance is needed for the weld attachment of bogey pads, the suspension components can be bolted closer to the bottom of the hull by a measurable distance. This lower mounting position for the suspension component allows a suspension having the same vertical travel as current production units to increase the vehicle ride height by the amount that the suspension components mount lower on the hull. The vehicle ride height is the vertical distance from the ground to any structure on the vehicle that might impinge the ground. In turn, the increased vertical ride height raised the effective height of the sponson from the ground by enough distance to allow the accommodation of an armor steel plate. This armor plate, mounted on the exterior of the sponson, and the thicker one-piece vertical side wall plate provides increased resistance to the penetration of piercing fragments from land mine blasts. The additional vehicle ride height allows for better cross country mobility due to the reduction of sprocket and hull impacts with terrain elements.

Most of the top plate is reused, keeping its mounting provisions intact. This is accomplished by careful location of cut 62 and augmentation by additional component 68 which effectively lengthens the top plate a significant length equivalent to the length of the side plate 64 in order to comport to the new length of the hull structure.

The rotation of the final drive around the input shaft by an angular coordinate is dictated by the a desired sprocket location high enough off the ground so that a member of the suspension system such as a roadwheel, rather than the final drive, is the first to encounter an obstacle, thus enabling the vehicle to climb over such obstacles, thus enhancing vertical obstacle crossing capability and off-road cross country mobility.

In summary, in a simple embodiment of the invention, the current multi-element subassemblies in the lower hull of the armored, tracked vehicle of the troop carrying type is replaced with a single thick aluminum plate as the vertical side plate and the bottom plate where the desired features from the previous subassemblies have been machined into the plates. The result is a more cost-efficient, producible design with improved vertical obstacle crossing capability, higher off-road cross country mobility compared to tracked vehicles for troop transportation over all terrain and added troop protection from the enhanced resistance to penetration of the hull by piercing fragments from land mine detonations.

The foregoing description, when read in conjunction with a perusal of the drawing figures, shows how the implementation of hull configuration and modification of tracked vehicle can be and is used to meet the objects of the invention. The following claims seek to protect the inventor's idea by claiming the improvements and modifications to the track vehicle in a manner that captures the spirit of the invention. Minor deviations and nuances of the invention are contemplated as being covered by the following claims.

What is claimed is:

1. A method of reconfiguring and modifying an armored, tracked vehicle comprising the steps of:

securing an existing tracked armored vehicle to serve as a pre-configured subject vehicle, said subject vehicle having joined existing upper and lower hulls, said existing upper hull including a pair of existing side walls and an existing top plate with existing commander and driver openings, each of said openings having an original position;

separating the existing upper hull from the existing lower hull;

providing a new lower hull having a width substantially equal to and a length longer than the existing lower hull;

transversely, vertically sectioning the existing upper hull between the existing commander and driver openings;

cutting the existing top plate to remove the existing commander opening;

securing an extension between each of the existing side walls to accommodate the length of the new lower hull;

forming a new plate shaped to mate with the side wall extensions and the cut existing top plate;

forming in the new plate a new commander opening positioned rearward relative to the original position of the existing commander opening;

securing the new plate to the top plate and to the extensions to form a reconfigured upper hull; and securing the reconfigured upper hull to the new lower hull.

2. A method of reconfiguring and modifying an armored, tracked vehicle comprising the steps of:

securing an existing tracked armored vehicle to serve as a pre-configured subject vehicle, said subject vehicle having joined existing upper and lower hulls;

separating said existing upper hull from said existing lower hull;

altering said existing upper hull to create a new upper hull of longer length but of substantially the same width;

forming a new lower hull comprising the steps of:
providing a new bottom plate of ballistic material having a width substantially equal to length of the new upper hull;
forming left and right side plates, each of said side plates having (i) a vertical height, (ii) a lower inner edge, and (iii) a length substantially equal to the length of the new upper hull by machining each of said side plates from a single piece of ballistic material;
forming a notch along the lower inner edge of each of said side plates to accept the new bottom plate;
securing the new bottom plate to said side plates with the new bottom plate in said notch of the left and right side plates to create a mechanical lock therebetween with a shear area extending substantially the vertical height of each side plate; and securing said new upper hull to said new lower hull.

* * * * *